United States Patent [19]

Fletcher et al.

[11] 3,832,764

[45] Sept. 3, 1974

[54] TOOL FOR USE IN LIFTING PIN-SUPPORTED OBJECTS

[76] Inventors: James C. Fletcher, Administrator of the National Aeronautics and Space Administration, with respect to an invention of; Ronald A. Marzek, 5162 Stratford Ave., Westminster, Calif. 92683; William S. Read, 3336 Sparr Blvd., Glendale, Calif.

[22] Filed: June 18, 1973

[21] Appl. No.: 370,872

[52] U.S. Cl. .................................. 29/203 H, 29/268

[51] Int. Cl. .............................................. B25b 27/02

[58] Field of Search ........... 29/203 H, 268, 203 HT, 29/203 HC, 206

[56] References Cited

UNITED STATES PATENTS

| | | | |
|---|---|---|---|
| 3,177,567 | 4/1965 | Gehrman | 29/268 X |
| 3,443,297 | 5/1969 | Lusby, Jr. | 29/206 X |
| 3,516,142 | 6/1970 | De Rose et al. | 29/203 H |
| 3,588,983 | 6/1971 | Hoy | 29/203 H |

*Primary Examiner*—Thomas H. Eager
*Attorney, Agent, or Firm*—Monte F. Mott; John R. Manning; Paul F. McCaul

[57] ABSTRACT

A tool for use in lifting a pin-supported, electronic package mounted in juxtaposition with the surface of an electronic circuit board. The tool is configured to be received beneath a pin-supported package and is characterized by a manually operable linkage, including an elongated body within which an elongated, rigid link is supported for axial reciprocation and a pivotal link pinned to the body and supported for oscillation induced in response to axial motion imparted to the rigid link. A lifting plate is pivotally coupled to the distal end of the pivotal link so that oscillatory motion imparted to the pivotal link serves to move the plate vertically for elevating the plate into lifting engagement with the electronic package positioned thereabove.

5 Claims, 7 Drawing Figures

PATENTED SEP 3 1974

3,832,764

TOOL FOR USE IN LIFTING PIN-SUPPORTED OBJECTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates generally to extractors for removing electronic components from circuit boards and more particularly to a manually operable tool for use in lifting electronic packages supported above the surface of a circuit board by mutually spaced vertically oriented pins seated in sockets formed in the board.

2. Description of the Prior Art

The prior art includes extractors of various types for lifting electronic components having pins seated in sockets secured within circuit boards. The devices disclosed in U.S. Pat. Nos. 3,177,567; 3,443,297, 3,516,142; and 3,588,983 exemplify the state of the art. However, the devices currently available simply do not fulfill existing needs.

As is appreciated by those familiar with integrated circuits, in instances where multi-pin packages are installed in sockets provided in circuit boards, removal for testing and/or replacement oftentimes involves expensive and time-consuming procedures. Removal of such packages normally requires an application of a substantial amount of force applied directly to the package for dislodging the pins from the socket in which they are received. Obviously, it is desirable to effect removal of such packages without bending or breaking any of the supporting pins and/or fracturing or otherwise damaging the packages. Thus, an application to the package of linear forces substantially perpendicular to the plane of the circuit board within which the sockets are seated is preferred. Tools which apply a force only at one end of such a package do not fully satisfy existing needs, due to the simple fact that such procedures often result in a damaging of the package pin, or socket, as removal is effected. This inadequacy is amplified in instances where a package to be removed is remotely located from a chassis access opening.

It is therefore a general purpose of the instant invention to provide a manually operable tool particularly suited for applying a linear force to pin-supported packages in planes perpendicular to the plane of circuit boards within which supporting sockets are provided, and one which readily can be employed in removing pin-supported packages from circuit boards at positions heretofore considered substantially inaccessible.

OBJECTS AND SUMMARY OF THE INVENTION

It is therefore an object of the instant invention to provide a tool for use in lifting pin-supported objects.

It is another object to provide an improved tool for use in removing electronic circuit components from supporting structure.

It is another object to provide a manually operable tool for use in extracting electronic packages from supporting circuit boards.

It is another object to provide an improved tool for use in manually extracting pin-supported, integrated circuit components from supporting circuit boards without subjecting the components to force-induced damage.

These and other objects and advantages are achieved through the use of a manually operable tool having an elongated body configured to be received beneath a pin-supported, integrated circuit component, coupled with a circuit board through a use of multiple sockets, and having a manually operable linkage adapted to apply a lifting force to the component for extracting the component from the board, as will hereinafter become more readily apparent by reference to the following description and claims in light of the accompanying drawings.

DESCRIPTION OF THE PREFERRED EMBODIMENT

Figure 1:
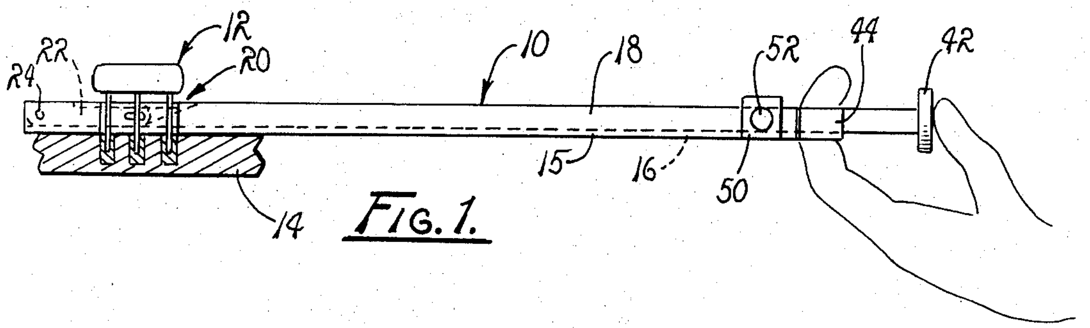
FIG. 1 is an elevational view of a tool which embodies the instant invention, depicting a use thereof.
Figure 2:
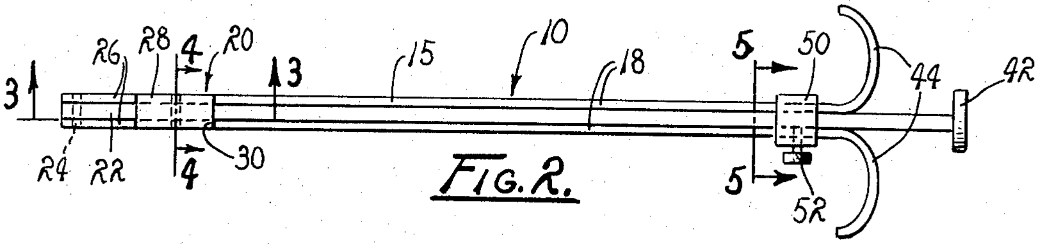
FIG. 2 is a top plan view of the tool shown in FIG. 1.

Referring now to the drawings wherein like reference characters designate like or corresponding parts throughout the several views, there is shown in FIG. 1 a manually operable tool, generally designated 10, which embodies the principles of the instant invention.

The tool 10 is configured and suitably dimensioned to be received beneath a package, generally designated 12, supported by pins received within sockets, not designated, embedded in a circuit board generally designated 14. It will be appreciated that the particular circuit, circuit board, or circuit component, with which the tool 10 is employed forms no part of the instant invention, therefore a detailed description of the circuit, circuit board, and circuit component is omitted in the interest of brevity.

Figures 3, 4, 5, 6, 7:
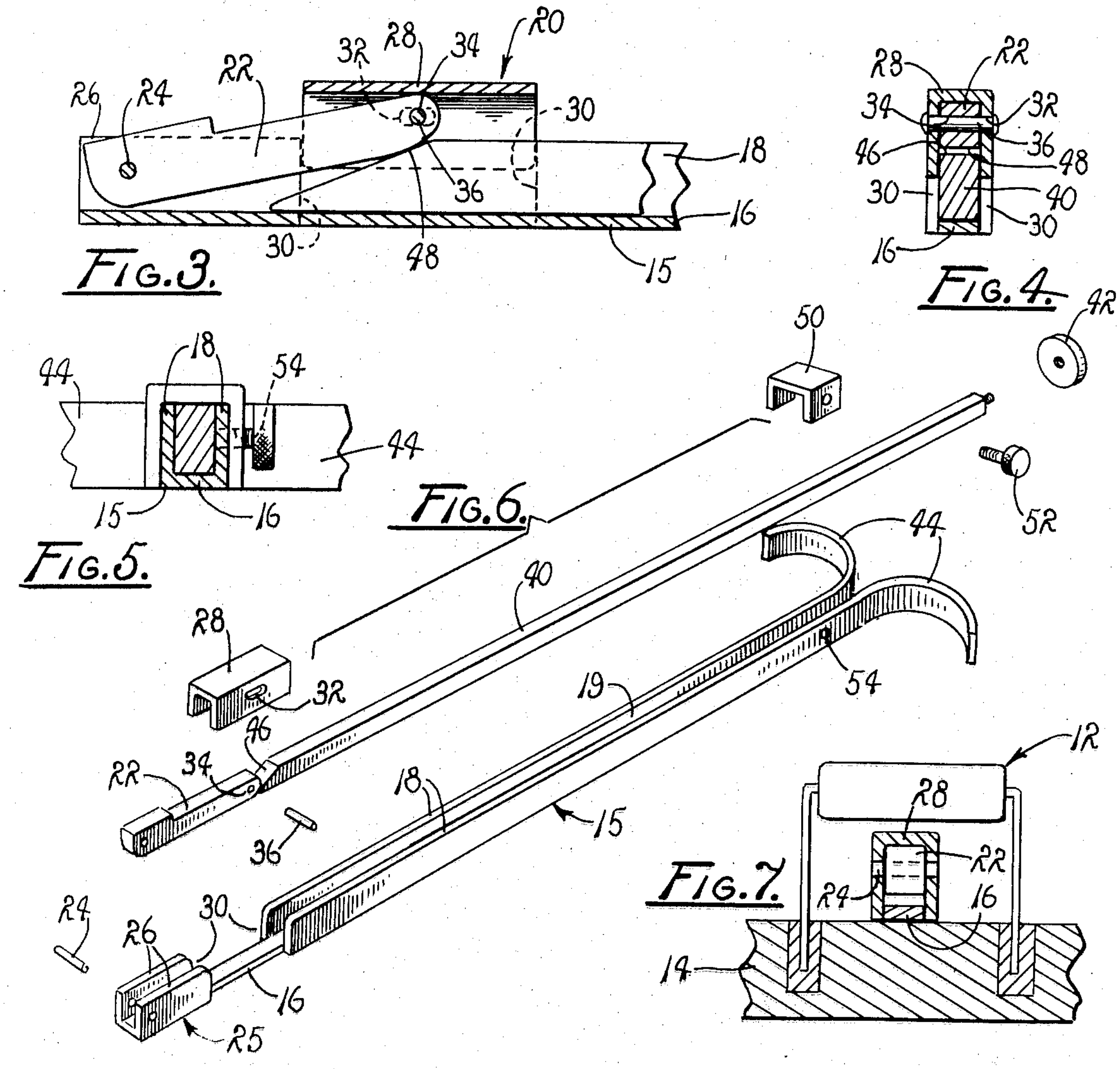
FIG. 3 is a fragmented, sectioned view taken generally along line 3—3 of FIG. 2.
FIG. 4 is a cross-sectional view taken generally along line 4—4 of FIG. 2.
FIG. 5 is a cross-sectional view, similar to the view of FIG. 4, taken generally along line 5—5 of FIG. 2.
FIG. 6 is an exploded perspective view of the tool.
FIG. 7 is a vertically sectioned view of the tool as it is received beneath a typical integrated circuit component mounted on a circuit board through a use of pins seated in sockets.

The tool 10 includes a body 12 of a generally U-shaped configuration consisting of a bearing plate 16 and a pair of mutually spaced walls 18, orthogonally projected in parallelism from the bearing plate 16. As a practical matter, the walls 18 define a channel 19 therebetween while the height of the walls 18 is such that a force applicator, generally designated 20, provided at one end of the body 15 of the tool 10 can readily be inserted beneath a pin-supported component 12 to be removed. The force applicator 20, as shown in FIG. 3, includes a pivotal link 22 coupled with the walls 18 by a pivot pin 24 extended through suitable openings provided in alignment within a bracket 25. The bracket 25 is provided as a pair of terminal segments 26, FIG. 6, of the walls 18. Thus, the pivotal link 22 is supported for oscillation about an axis orthogonally related to the longitudinal axis of symmetry of the body 15 of the tool 10.

Coupled to the distal end of the pivotal link 22 there is a lifting plate 28 of an inverted U-shaped configuration. The plate 28 preferably is provided with a cross-sectional dimension precisely corresponding to the cross-sectional dimension of the body 15 and is of a length such that it is readily received within an opening 30 provided between the adjacent ends of the walls 18 and the bracket 25. Therefore, it is to be understood that when the lifting plate 28 is seated within the opening 30, the surfaces of the body 15 of the tool 10 are substantially uninterrupted so as to accommodate an insertion thereof beneath a selected component.

The lifting plate 28 is coupled with the distal end of the pivotal link 22 through a lost-motion linkage including a pair of coaxially aligned elliptical openings 32. An opening 34 is provided in the distal end of the link 22, and a bearing pin 36 is extended through these openings. It is to be understood that the pin 36 is afforded motion along the length of the openings 32 so that linear motion is imparted to the plate 28 as pivotal motion is imparted to the pivotal link 22.

Within the channel 19, defined between the walls 18, there is seated for reciprocation a rigid link 40 of a substantially rectangular configuration. The link 40 is received within the channel 19 and guided by the adjacent surfaces of the bearing plate 16 and walls 18 as axial reciprocation is imparted thereto. As a practical matter, a thumb plate 42 is screw-threaded to one end of the rigid link 40, as it extends from one end of the body 15, opposite the force applicator 20. It is to be understood that the particular manner in which the plate 42 is affixed to the link 40 is varied, as desired. The purpose of the plate 42 is to provide for a manual application of an axial force to the rigid link 40. In order to enhance the use of the tool 10, there is provided a pair of outwardly extended, coplanar finger pads 44. The finger pads 44 and the thumb plate 42 are positioned, as illustrated in FIG. 1, so as to accommodate a manipulation of the link 40 as the user's fingers are received by the finger pads and the thumb of the user is received by the thumb plate.

At the end of the rigid link 40, opposite the thumb plate 42, there is provided a cam surface 46. This surface is configured as a ramp extending outwardly and rearwardly from the bearing plate 16, toward the thumb plate 42. The cam surface 46 is in juxtaposition with a cam follower surface, designated 48, of a substantially arcuate configuration provided at the distal end of the pivotal link 22, as best illustrated in FIG. 6.

The purpose of the cam surface 46 and the cam follower surface 48 is to impart pivotal motion to the link 22, about the pin 24, as axial motion is imparted to the rigid link 40. Therefore, the surfaces 46 and 48 are arranged in contiguous engagement so that forwardly directed axial motion imparted to the rigid link 40 causes arcuate motion to be imparted to the pivotal link 22. Such arcuate motion is, in turn, converted by the lost-motion linkage to linear motion, which is then applied along a path orthogonally related to the longitudinal axis of the rigid link 40.

It is, of course, to be understood that, where desired, a retainer may be employed for maintaining the components of the tool 10 in an associated relationship. Therefore, a bracket 50 of an inverted U-shaped configuration is provided for purposes of receiving the body 15 of the tool 10, while a setscrew 52 is extended through one leg of the bracket into a coupling relationship with the body 15. A screw-threaded opening 54 is provided for receiving the screw-threaded shank, not designated, of the setscrew 52 so that the setscrew can be threaded into engagement with the body 15 for thereby securing the bracket 50 in place.

OPERATION

It is believed that in view of the foregoing description, the operation of the device will readily be understood and it will be briefly reviewed at this point.

With the tool 10 assembled in the manner hereinbefore described, it is to be understood that a pin-supported circuit component can readily be extracted from a circuit board through a simple use thereof.

In operation, the force applicator 20 of the tool 10 is inserted between a selected component 12 and the adjacent surface of the circuit board. With the force applicator 20 so positioned, an operator grasps the tool 10 by positioning a pair of fingers in the arcuate finger pads 44, while applying thumb pressure to the thumb plate 42. The pressure thus applied serves to impart axial motion to the rigid link 44 for thus causing the cam surface 46 to engage the cam follower surface 48 and impart pivotal motion to the pivotal link 22. As pivotal motion is imparted to the link 22 linear motion responsively is imparted to the lifting plate 28, due to the effect of the lost-motion linkage through which the plate 28 is connected with the pivotal link 22. The linear motion thus applied to the lifting plate 28 serves to impart linear motion to the component 12 supported on the circuit board, for thereby lifting and disassociating the component 12 from the board as the supporting pins are extracted from their supporting socket.

In view of the foregoing, it should be readily apparent that the tool embodying the principles of the instant invention, as hereinbefore described, provides a practical solution to the perplexing problem of expeditiously disassociating electronic components from circuit boards, without subjecting such components to the deleterious effects of improperly applied removal forces.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A tool for use in lifting pin-supported objects comprising:

A. an elongated body configured to be received beneath a pin-supported object to be lifted;

B. linkage means including a rigid link supported by said body for axial motion along a path extended in parallelism with the longitudinal axis of symmetry of said body; and C. means responsive to axial motion imparted to said link for transmitting a lifting force to the object to be lifted.

2. The tool of claim 1 wherein said elongated body has a cross-sectional configuration including a pair of upstanding legs arranged in substantial parallelism, and said rigid link is disposed between the legs.

3. The tool of claim 2 wherein said means responsive to axial motion imparted to said link includes a pivotal link supported for oscillation about a first pivotal axis extending through the base portion of said pivotal link and in orthogonal relation with said longitudinal axis of symmetry, and a plate having an inverted U-shaped configuration pivotally coupled with said pivotal link and supported for oscillation about a second pivotal axis extended through the distal end portion of the pivotal link in parallelism with said first pivotal axis.

4. The tool of claim 3 wherein said linkage means further includes a cam surface of a wedge-shaped configuration formed at one end of said rigid link and a cam follower surface of a substantially arcuate configuration formed at the distal end of said pivotal link in juxtaposition with said cam surface, whereby selected axial motion imparted to said link causes said cam surface to engage said cam follower surface for imparting arcuate motion to said pivotal link.

5. A manually operable tool for use in lifting an electronic package supported above the surface of a circuit board by mutually spaced, vertically oriented pins seated in sockets formed in the board comprising:

A. an elongated body of a substantially U-shaped cross-sectional configuration having a pair of laterally spaced vertically oriented walls extending in parallelism with the longitudinal axis of symmetry of said body;

B. an elongated rigid link of a substantially rectangular configuration supported for axial reciprocation along a path extended between the walls of said body, in parallelism therewith, said link being characterized by a thumb plate disposed in spaced relation with a first end of said body and a camming surface disposed at the opposite end thereof, adjacent to the second end of said body;

C. a force applicator including a pivotal link pinned at its base end portion to said body and supported for oscillatory motion about an axis orthogonally related to the longitudinal axis of said body, a lifting plate, means including a lost-motion linkage coupling said lifting plate to the distal end portion of said pivotal link for oscillatory motion about the distal end thereof, and a cam-follower surface provided at the distal end of said pivotal link within the path of said rigid link for engaging said camming surface as selected axial motion is imparted to the rigid link whereby said plate is displaced into lifting engagement with said package; and D. a pair of oppositely curved arcuate members extended from said body at opposite sides of said axis of symmetry adapted to be received by a pair of mutually spaced human fingers.

* * * * *